UNITED STATES PATENT OFFICE.

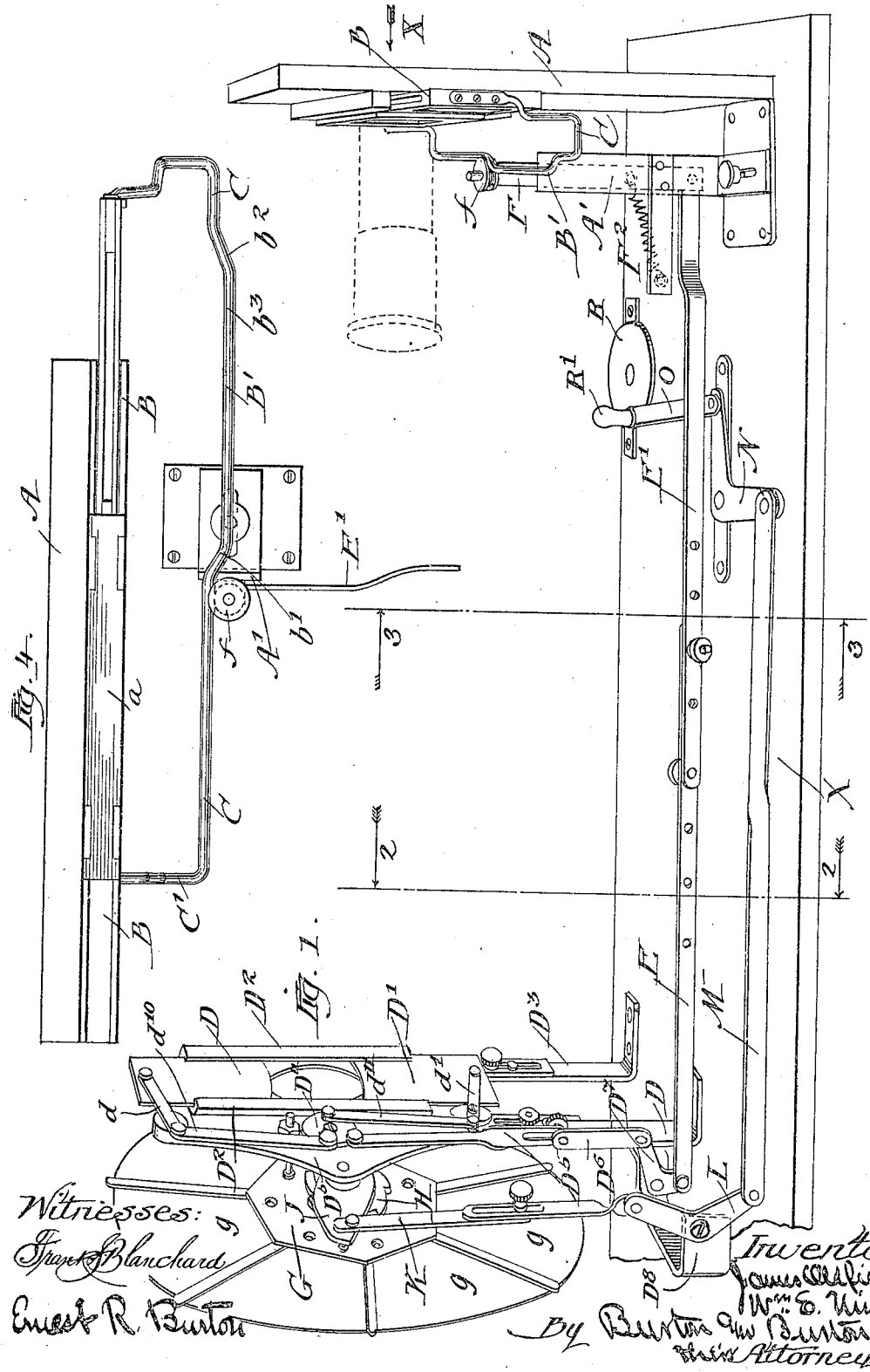

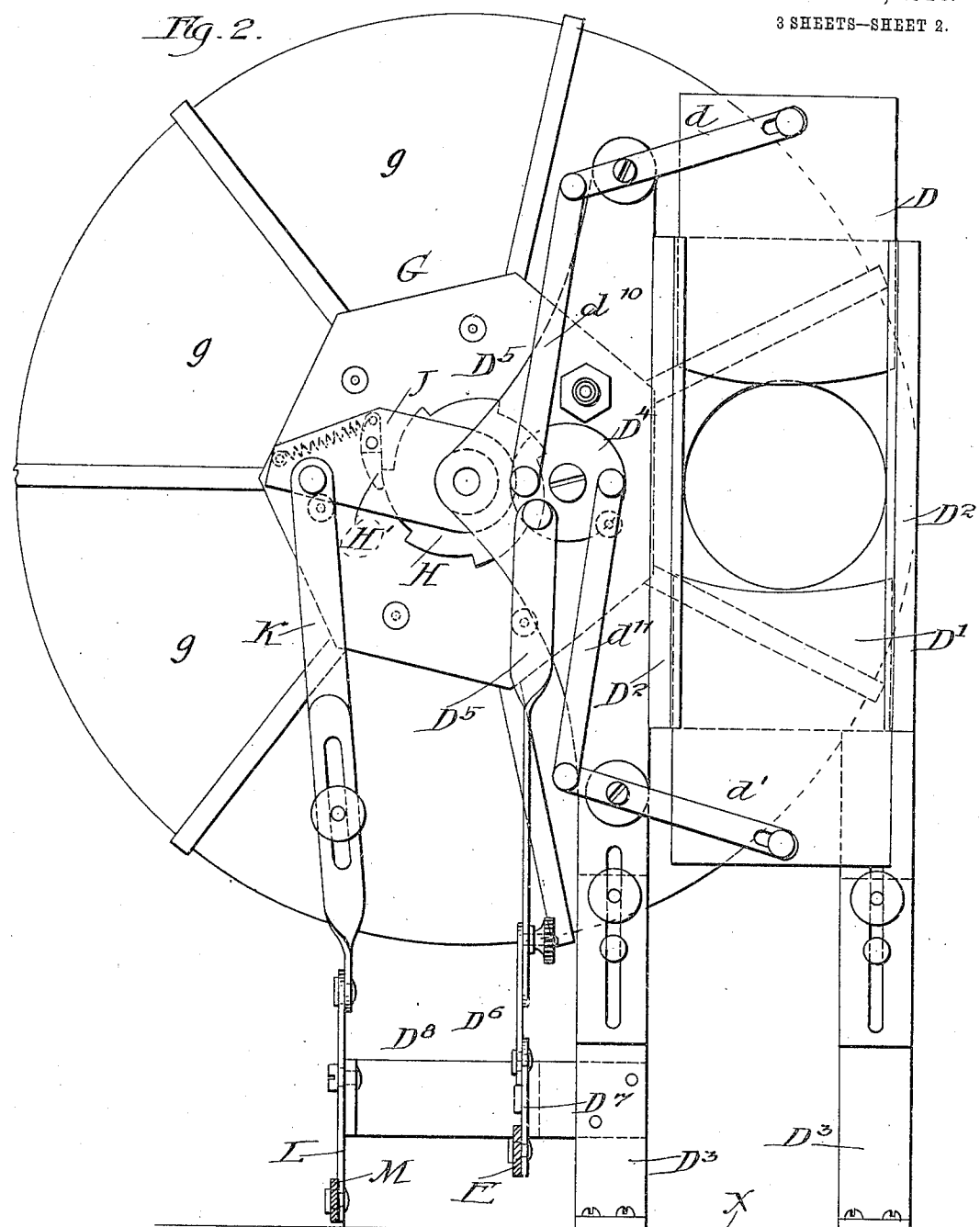

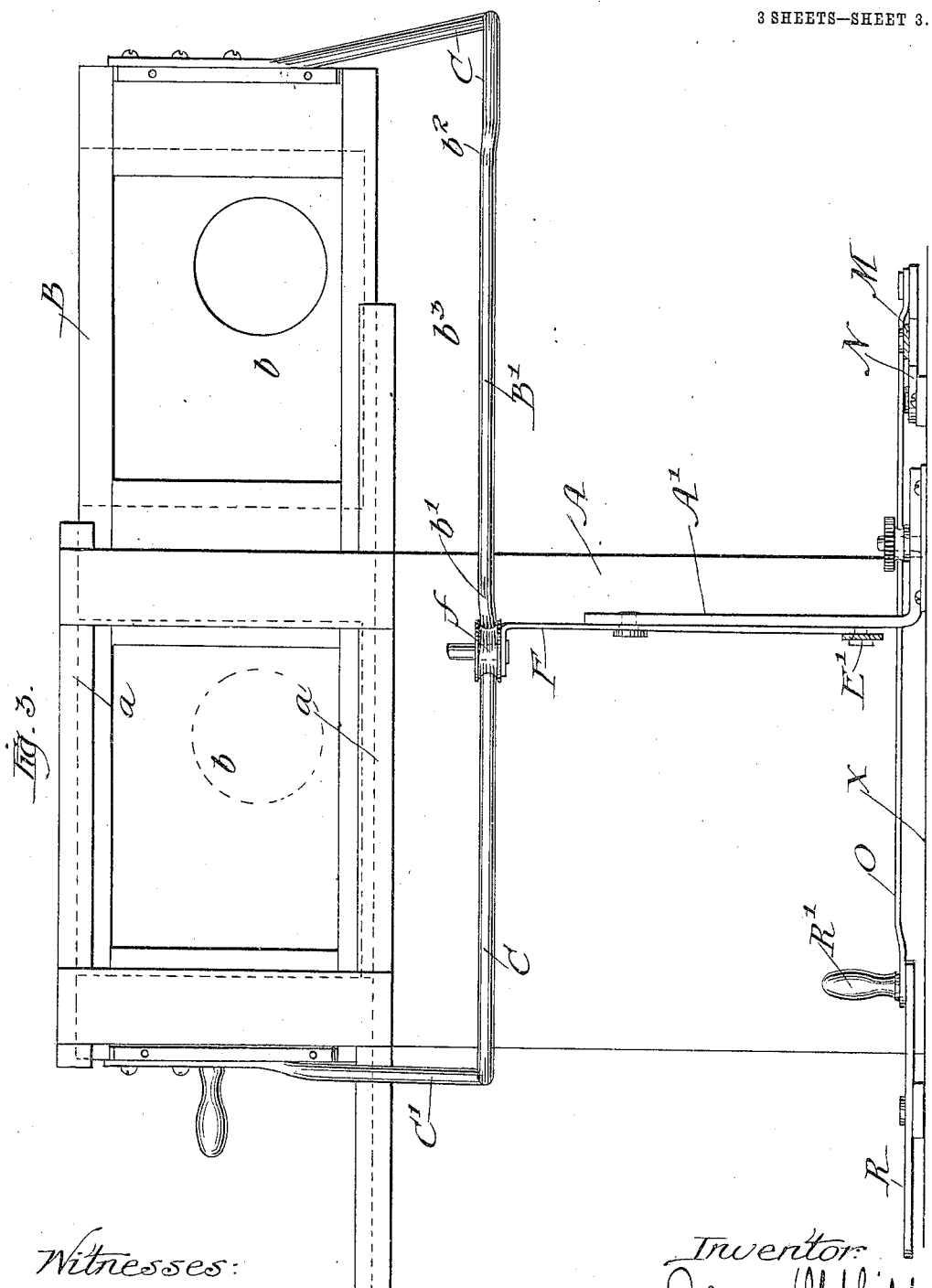

JAMES OLDFIELD AND WILLIAM E. NIMZ, OF CHICAGO, ILLINOIS.

SLIDE AND SHUTTER OPERATING DEVICE FOR MAGIC LANTERNS.

952,346.

Specification of Letters Patent. Patented Mar. 15, 1910.

Application filed July 19, 1909. Serial No. 508,296.

*To all whom it may concern:*

Be it known that we, JAMES OLDFIELD and WILLIAM E. NIMZ, citizens of the United States, residing at Chicago, in the county of Cook and State of Illinois, have invented new and useful Improvements in Slide and Shutter Operating Devices for Magic Lanterns, of which the following is a specification, reference being had to the accompanying drawings, forming a part thereof.

The purpose of this invention is to provide an improved apparatus especially designed for "dissolving view" effects in a stereopticon or magic lantern, but serviceable for other uses in connection with such instruments, being for both purposes a mechanism for operating the slides and a shutter, and for some purposes, the light-modifying screens in such an instrument.

It consists of the elements and features of construction shown and described as indicated in the claims.

In the drawings:—Figure 1 is a perspective view of an apparatus comprising this invention. Fig. 2 is a vertical section at the line 2—2 on Fig. 1, showing in inner side elevation the shutter and light-modifying or "colored light" screens and operating connections. Fig. 3 is a section at the line 3—3 on Fig. 1, looking in the opposite direction from the view in Fig. 2 and showing in elevation the slide carrier and operating connections. Fig. 4 is a top plan view of the slide carrier and immediate operating connections.

In the drawings, A is a standard upon which the lens and slide carrier are mounted. An arrow X, Fig. 1, indicates the direction from which the light reaches the slide.

B represents the slide carrier; C a cam device attached to it for communicating movement, as hereinafter described, to the shutter.

D and $D^1$ are respectively the upper and lower members of a two-part shutter mounted for sliding in vertical guide-ways, $D^2$, on standards, $D^3$. Both the standards, A and $D^3$, are shown mounted upon the supporting board or base, X. Two shutter members, D and $D^1$, are operated for opening,—the first upwardly and the other downwardly,—by lever and link connections consisting of levers, $d$, $d^1$, connected to the shutters respectively, and by links, $d^{10}$, $d^{11}$, to a lever or wrist plate, $D^4$, fulcrumed on the shutter standard and connected by an adjustable link, $D^5$, $D^6$, to a bell-crank lever, $D^7$, also fulcrumed on the shutter standard. The bell crank lever, $D^7$, is operated by an adjustable link, E, $E^1$, connected to the downwardly extending arm of the bell-crank lever and extending toward the slide standard, A, and connected to the lower end of the lever, F, fulcrumed on the bracket, $A^1$, rigid with the standard, A. The upper end of the lever, F, is provided with a grooved roll, $f$, which is engaged by a cam bar, $B^1$, rigid with the slide carrier, B.

The slide carrier is of familiar construction fully shown in Fig. 3, having spaces, $b$, $b$, for two slides and running in slide-ways, $a$, $a$, mounted on the standard, A, for bringing either sliding space and the slide therein into the path of the beam of light from the shutter to the lens. The cam bar, $B^1$, has cam offsets or sloping shoulders, $b^1$, $b^2$, positioned so that they respectively encounter the roll, $f$, at the first movement of the slide carrier from either operative position. That is to say, so that one or the other cam shoulder stands immediately adjacent to the roll at each of the operative positions and acts upon the roll immediately upon the first movement of the slide away from that position. The action of the cam shoulder upon the roll, and thereby on the lever, F, being to swing the upper end of the lever toward the shutter standard, retracting the link, E, toward the slide standard, causes the shutter, D—$D^1$, to be closed together instantly at the commencement of the movement of the slide carrier. The length of the straight part, $b^3$, of the cam rod, $B^1$, between the shoulders corresponds to the movement from center to center of the slide apertures, $b$, $b$, so that the lever, F, which is provided with a spring, $F^2$, for retracting its lower end away from the standard, A, returns to position shown in Fig. 1 at the instant the slide carrier reaches the limit of its sliding movement for positioning the slide, which is by that movement brought into the line of light; and such retracting movement of the lever, F, by means of the connections described, opens the shutters at the instant the slide thus reaches operative position. The entire movement of the slide will be effected by the hand of the operator taking hold either of the loop, $C^1$, of the cam rod, C, or taking hold of the slide carrier itself directly. It can be quickly performed so that the whole sliding movement occupies but a small fraction of a second, namely the time occupied by the movement of the shutters, which is merely the time required for the cam shoulder to pass the roll. This is too short to be appreciated by the eye, and the effect is that at the instant of the commencement of the movement disturbing the position of the slide, which has been in operating position, the shutters are closed,—cutting off the light,—and remain closed during the very small fraction of a second during which the sliding movement is performed, being opened again instantly upon the completion of the sliding movement when the new slide is in position. The entire movement of the slide is performed during a very brief instant of darkness, so short that the eye will not perceive that the light has been cut off, but will merely discover that the picture has changed, without having perceived any movement or even any momentary blur which is observable when two pictures lap for a brief time upon the screen in the ordinary movement of effecting dissolving views,—by shifting the light from one picture to the other or by sliding one view past the other while both are in the beam of light.

In connection with this device for simultaneously operating the slide carrier and shutter, we provide means for changing the light screens for producing the effect of colored lights by mounting the colored screen carrier G, for rotation to carry several colored panels $g$ which are arranged in a circular series about the axis of rotation in front of the shutter opening, step by step, so that any screen may be halted in operative position. The screen carrier is operated by a pawl-and-ratchet device, the ratchet disk, H, being mounted on the carrier, and the pawl, $H^1$, on an oscillating lever, J, fulcrumed on the stud axle upon which the screen carrier is mounted for rotation, such stud axle projecting from a bracket arm, $D^5$, of the shutter standard. An adjustable link, K, connects the oscillating lever, J, with a bell-crank lever, L, which is fulcrumed on the same extension, $D^8$, of the shutter standard upon which the bell crank lever, $D^7$, is fulcrumed, the lower arm of said bell crank lever, L, being connected by a link, M, to one arm of a horizontally positioned bell crank lever, N, fulcrumed on the base board and connected by a link, O, to a crank pin on a horizontally positioned wheel or disk, R, the crank pin being extended to form a handle, $R^1$, by which the disk is rotated to reciprocate the link, and through the connections indicated, operate the oscillating lever, J, rotating the screen carrier at each rotation of the wheel, R, one step, changing the screen which is positioned in front of the shutter opening.

The rotation of the wheel, R, can be performed rapidly so as to shift from any screen to any other screen in the series past any intermediate screens so quickly that the colors of the intervening screens produce no sensible impression upon the eye, only the color at which the screen carrier is halted remaining long enough to produce an impression.

The slide carrier connected with the shutter so as to cause the shutter to be closed while the carrier is being moved may be used not only for dissolving views, but for other purposes for which the slide carrier carries other devices instead of the transparencies or slides; as, for example, a spot light slide; that is, a plate mounted in the carrier in the position in which the transparencies are mounted, having an aperture through which the beam of light passes to produce a spot or limited area of light on the stage. When it is desired to shift the spot from one position to another on the stage, for the purpose, for example, of causing to appear first one character or feature upon one position of the stage, and then instantly at another position on the stage another character or feature, the whole remaining stage except that covered by the spot light being dark, so that the effect produced is that of the sudden appearance and disappearance of characters or features at different parts of the stage, the operator is furnished a series of apertured plates corresponding to slides having the apertures at the different positions suitable for locating the spot light as desired in successive positions on the stage. These apertured plates are supplied successively to the two apertures of the carrier in the same manner as successive transparencies are supplied in operating the device for dissolving view effects, and the carrier being then operated in connection with the shutter by the devices shown at each reciprocation of the carrier, the spot light disappears from one place on the stage and reappears at another, the intervening interval of darkness caused by the closing of the shutter being inappreciable, the effect being as if the spot of light had jumped instead of traveled from one point to the other. Such spot light plates are shown in the carrier in Fig. 3.

In operating the device, especially for the purpose of shifting spot lights, but sometimes and also in shifting transparencies for dissolving view effects, it is desirable to change the color at the same time that the transparency or position of the spot is changed, and this can be effected by the operator rotating the plate, R, for rotating the screen carried at the same time that he operates the slide.

We claim:—

1. In combination with a slide carrier for magic lanterns, an element operated by the carrier in the sliding movement of the latter; a shutter; mechanism for opening and closing the shutter, and operating connections therefor comprising a part positioned for encounter by the carrier-operated element at the beginning and end of said carrier's movement.

2. In combination with a magic lantern slide carrier, a cam device carried therewith in its slide-carrying movement; a shutter; mechanism for opening and closing the shutter, and operating connections therefrom comprising an abutment exposed in the path of the cam for actuation thereby.

3. In combination with a magic lantern slide carrier, a two-part shutter; mechanism for withdrawing the two parts of the shutter from each other for opening and retracting them together for closing; a cam device carried by the slide carrier in its slide-carrying movement, and operating connections for the two-part shutter comprising an abutment exposed in the path of the cam for actuation thereby.

4. In combination with a magic lantern slide carrier; a bar mounted thereon for sliding therewith having a cam edge comprising a portion approximately equal to the length of the sliding movement positioned parallel with such movement, and cam shoulders at the extremities of such parallel-positioned portion; a shutter; operating connections for opening and closing the shutter comprising a lever having an abutment exposed in the path of the cam shoulders, and means for holding such abutment against the cam edge for actuation by such shoulders.

5. In combination with a magic lantern slide carrier; a shutter comprising two members sliding vertically toward and from each other; a standard on which it is mounted; levers fulcrumed on the standard connected to the shutter members respectively; a wrist plate fulcrumed on the standard, and links therefrom to the levers respectively connected to the plate at opposite sides of the fulcrum thereof, and mechanical connections from the slide carrier to the wrist plate for rocking the same by the sliding of the carrier.

6. In combination with a magic lantern slide carrier; a cam bar mounted for travel therewith in the slide-carrying movement of the carrier having its cam edge positioned parallel with the slide-carrying movement for a length approximately equal to the extent of said movement, and having oppositely sloping shoulders at the extremities of said parallel-positioned portion; a shutter standard and two shutter members mounted thereon for vertical movement from and toward each other for opening and closing; levers fulcrumed on the standard and operatively connected with said shutter members respectively; a wrist plate fulcrumed on the standard; links connecting the wrist plate with the levers respectively; operating connections from the wrist plate extending toward the slide-carrier support comprising a member carrying an abutment positioned in the path of the cam shoulders, and a spring operating on said member for holding the abutment yieldingly against the cam edge.

7. In combination with a magic lantern slide carrier; a shutter and operating connections between the shutter and the slide carrier for closing and opening the shutter at the commencement and end of the slide carrier movements respectively; a carrier for colored light screens rotatably mounted adjacent to the shutter support; operating devices for giving such screen step by step rotative movement; a manually operated element rotatably mounted in the vicinity of the slide-carrier support, and operating connections therefrom to the screen rotating devices.

In testimony whereof, we have hereunto set our hands, in the presence of two witnesses, at Chicago, Illinois, this 15th day of July, 1909.

JAMES OLDFIELD.
WILLIAM E. NIMZ.

In the presence of—
ERNEST R. BURTON,
JULIA S. ABBOTT.